Oct. 27, 1925.

T. E. DAY 1,558,794

CHEESE TURNING MACHINE

Filed July 30, 1925   2 Sheets-Sheet 1

INVENTOR
Thomas E. Day.
BY
his ATTORNEYS

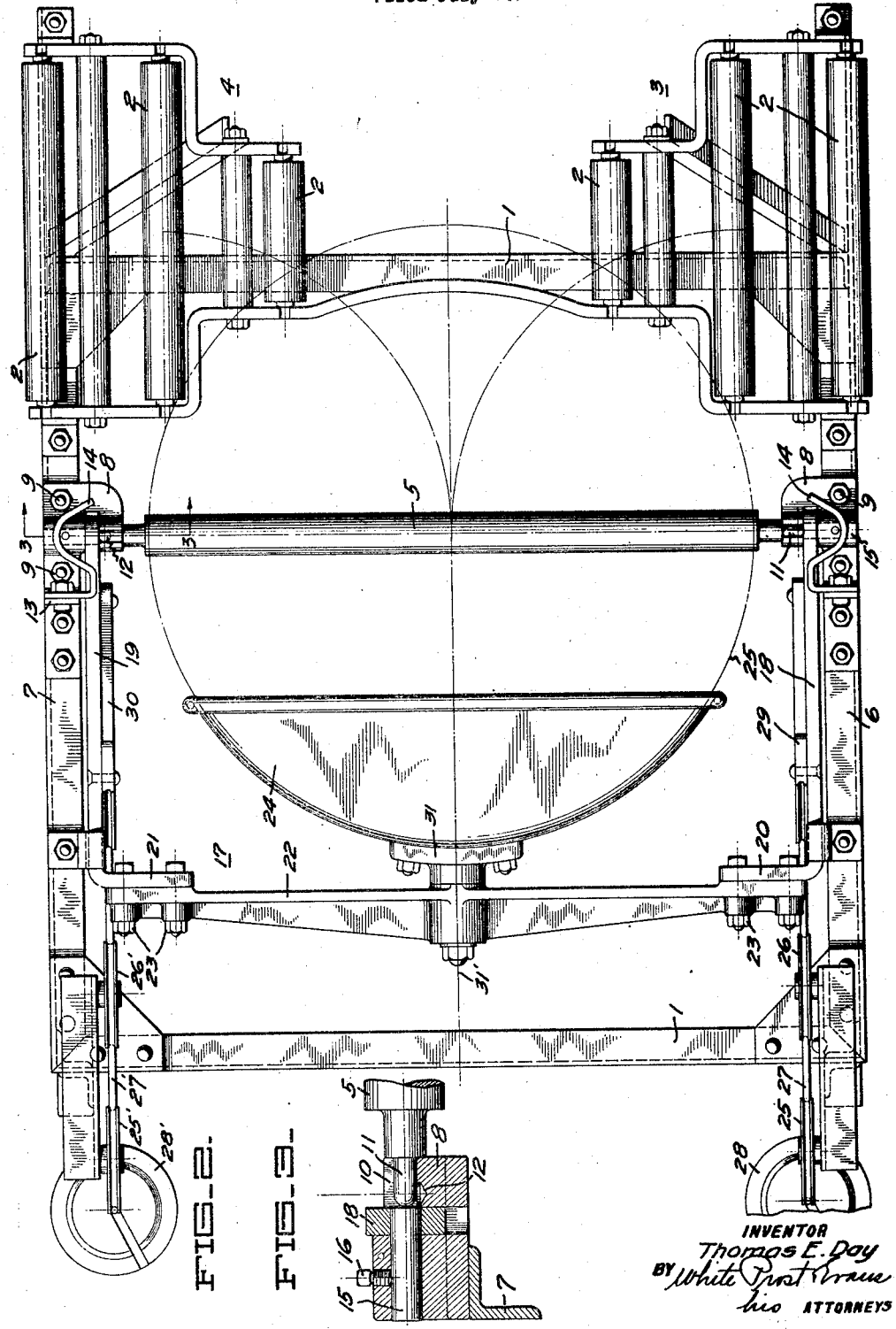

Patented Oct. 27, 1925.

1,558,794

UNITED STATES PATENT OFFICE.

THOMAS E. DAY, OF SAN FRANCISCO, CALIFORNIA, ASSIGNOR TO GOLDEN STATE MILK PRODUCTS COMPANY, OF SAN FRANCISCO, CALIFORNIA, A CORPORATION OF CALIFORNIA.

CHEESE-TURNING MACHINE.

Application filed July 30, 1925. Serial No. 46,985.

*To all whom it may concern:*

Be it known that I, THOMAS E. DAY, a citizen of the United States, and a resident of the city and county of San Francisco, State of California, have invented a certain new and useful Cheese-Turning Machine, of which the following is a specification.

This invention relates to mechanical apparatus for turning cheese and the like and has for its object the provision of simple and efficient means whereby cheese during the process of its manufacture may be readily turned with a minimum effort of manual labor. Cheese is generally manufactured in the form of large flat cakes, which are usually circular in cross-section, and may have a diameter of from two feet up and a thickness of from 8 or 10 inches up. The weight of such cakes may range from 100 pounds up. After the cake has been formed, it is stored in an appropriate place to dry or ripen. During the drying process, the upper surface dries more rapidly, and the lower surface may become mouldy or a crust may form thereon. It is therefore necessary frequently to turn the cake in order to expose the underside and treat or wash the cake with a suitable solution as well as to permit the cake to dry uniformly. Heretofore it has been necessary to turn each cake manually, which, due to their size and weight, required considerable time and manual labor. This invention therefore has for its object the provision of means whereby these difficulties may be overcome.

The invention possesses other advantageous features, some of which with the foregoing, will be set forth at length in the following description, where I shall outline in full that form of the invention which I have selected for illustration in the drawings accompanying and forming part of the present specification. In said drawings I have shown one form of said device, but it is to be understod that I do not limit myself to such form, since the invention as set forth in the claims may be embodied in a plurality of other forms.

Referring to the drawings:

Fig. 2 is a top plan view of the apparatus shown in full lines in Fig. 1; and

Fig. 3 is an enlarged sectional view taken on the line 3—3 of Fig. 2.

Figure 1:
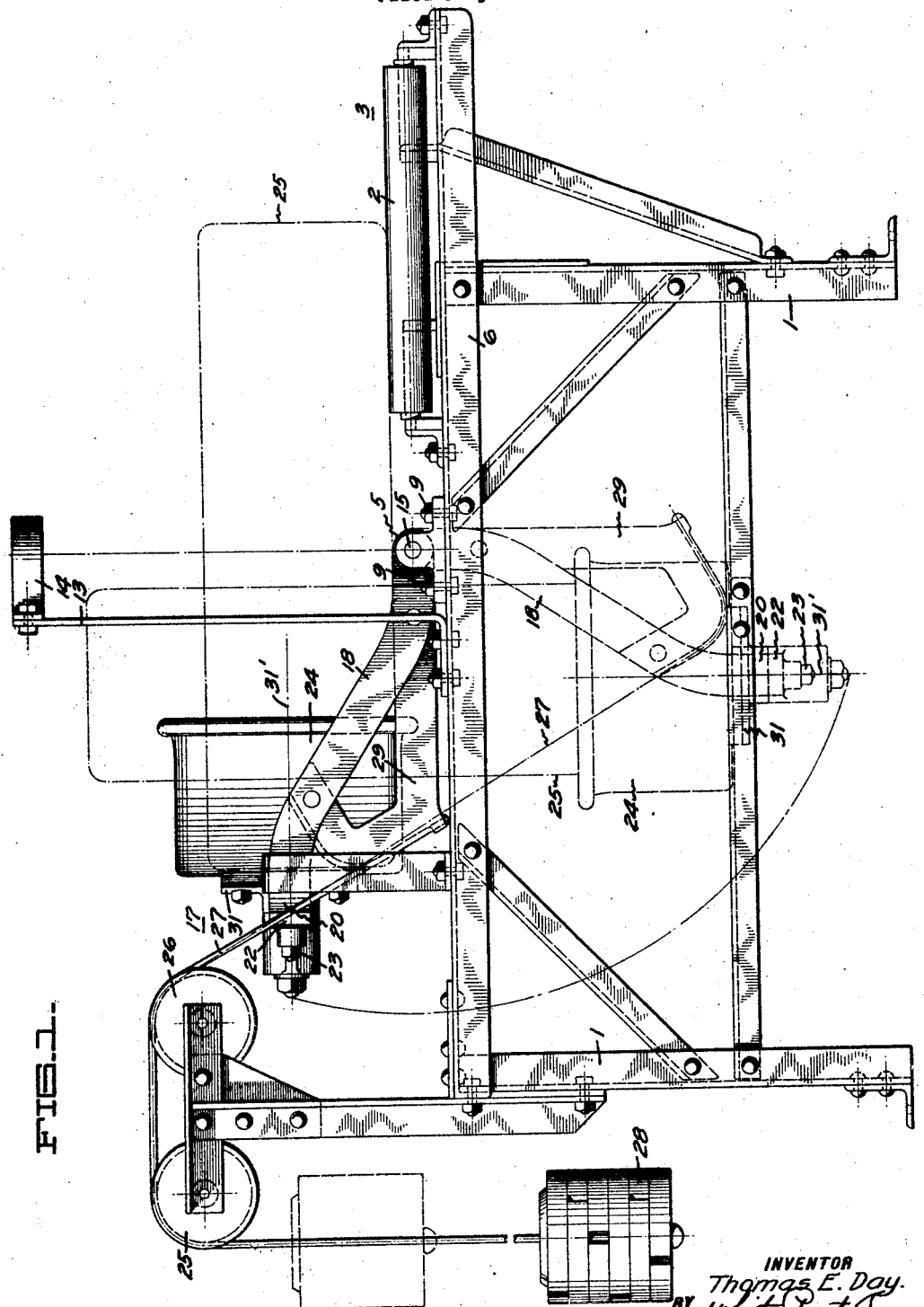
Figure 1 is a side elevation of one form of apparatus embodying my invention with an element also indicated in dotted lines in one of its operative positions.

In the drawings I have shown a suitable frame or structure 1 which supports the cheese turning apparatus. This structure is positioned in a convenient location so as to receive the cheese from a conveyor or other suitable transporting means from the usual drying shelves, which are not indicated in the drawings. One end of the frame 1 is provided with a plurality of parallel rollers 2. Preferably, two sets of these rollers are provided, as shown in Fig. 2 and indicated by the numerals 3 and 4. In practice, the frame 1 is so positioned that the cheese may be slid directly from the conveyor to the rollers 2. Spaced a suitable distance from the rollers 2, the frame 1 supports a roller 5. This roller extends across between the sides 6 and 7 of the frame 1 and is preferably at right angles to the rollers 2 as shown in Fig. 2. Each of the sides 6 and 7 is provided with suitable bearings for the roller 5, one of which is shown in enlarged section in Fig. 3. Since both bearings are similar, a description of one will be sufficient. The bearing comprises an element 8, suitably secured to the frame 1, such as by bolts or studs 9 and is formed with a slot 10 adapted to receive the reduced end 11 of the roller 5. By this arrangement, the roller may readily be lifted from its bearings. If desired, the elements 8 may each be provided with a small depression 12, adapted to receive the end 11 of the roller 5 when in a vertical position, and a vertical arm 13 may be secured to the frame carrying at its end a curved member 14 against which the roller 5 may lean when in a vertical position. Each of the elements 8 is also provided with a shaft 15 secured therein by a screw 16, as shown in Fig. 3, which shafts serve as the axis for and pivotally support a frame 17. This frame comprises two side members 18 and 19, which are journaled on the shafts 15, and normally extend in a direction away from the rollers 2. At their free ends the members 18 and 19 are respectively formed with L-bends, 20 and 21 which extend inwardly and support a cross-piece 22, which may be suitably secured thereto such as by bolts 23. Midway between the members 18 and 19, and preferably at a point corresponding to the center line of the frame 1, the cross-piece 22 rotatably supports a cup-shaped element or receptacle 24. The sides of the receptacle 24 are preferably in the shape of a segment of a circle, and the receptacle is of sufficient size and width to receive or encompass a portion of a cheese cake 25, as shown in Fig. 2. The receptacle 24 may be secured to a member 31 which is suitably journaled within the cross-piece 22 so as to rotatably support the receptacle 24 on a central axis 31' at right angles to the axis of the frame 17.

The end of frame 1 opposite the rollers 2 is provided with two sets of elevated pulley wheels 25, 26, and 25', 26' to receive cables 27, 27' which are attached at one end to weights 28, 28' respectively, and at their opposite end to members 29 and 30 which are respectively secured to the members 18 and 19.

From the foregoing detailed description, the operation of the machine will be readily understood from a brief statement thereof.

The cheese cake 25 is passed onto the series 3 and 4 of rollers 2 so as to bridge the same. The cheese is then pushed from the same so as to rest on the roller 5 and extend into the receptacle 24 as shown in Fig. 2. The frame 17 is then tilted about its axis 15 to the position indicated in dotted lines in Fig. 1, the cheese being balanced on the roller 5 during the tilting operation. The weights 28, 28' are proportioned with respect to the cheese as to approximately balance the same whereby the frame 17 together with the cheese may be tilted with little effort. After the cheese is in the tilted or vertical position, the roller 5 is removed, and the cheese with its receptacle 24 is rotated through 180° on the axis 31'. The roller 5 is then replaced in its bearings and the frame 17 is restored to its original horizontal position after which the cheese may be shoved over the roller 5 to the rolls 2 in a turned position. While removed from its bearings, the roller 5 may conveniently be set aside by positioning it in one of the depressions 12 and leaning it against the curved member 14 of the adjacent arm 13.

I claim:

1. A cheese turning machine comprising means for supporting the cheese in a substantially horizontal position, and means for supporting the cheese rotatably about a substantially vertical axis.

2. A cheese turning machine comprising means for receiving the cheese in a substantially horizontal position and means for moving the cheese to a vertical position and rotating the same about a vertical axis.

3. A cheese turning machine comprising a horizontal roller, and a vertically movable frame having a cheese receptacle rotatable about a central axis.

4. A cheese turning machine comprising a horizontal roller, a cup-shaped element adapted to receive a portion of the cheese when in a horizontal position and a pivoted frame movable in a vertical plane rotatably supporting said element about a central axis.

5. A cheese turning machine comprising a horizontal removable roller, and a vertically movable frame having a cheese receptacle rotatable about a central axis.

6. A cheese turning machine comprising a horizontal removable roller, a cup-shaped element adapted to receive a portion of the cheese when in a horizontal position and a pivoted frame movable in a vertical plane rotatably supporting said element about a central axis.

7. A cheese turning machine comprising a horizontal roller for receiving and supporting the cheese in a substantially horizontal plane, a frame rotatable about a horizontal axis, having means for receiving the cheese in its horizontal position and supporting the same in a vertical position, said means being rotatable about a vertical axis on said frame.

8. A cheese turning machine comprising a horizontal removable roller for receiving and supporting the cheese in a substantially horizontal plane, a frame rotatable about a horizontal axis, having means for receiving the cheese in its horizontal position and supporting the same in a vertical position, said means being rotatable about a vertical axis on said frame.

9. A cheese turning machine comprising means for balancing the cheese in a horizontal position, means for moving the same to a vertical position and means for rotating the cheese about a vertical axis when in its vertical position.

10. A cheese turning machine comprising a supporting structure, a horizontal roller thereon extending across the frame, a frame rotatably mounted on said structure movable in a vertical plane, means on said frame for supporting the cheese when said frame is rotated, said latter means being mounted on said frame for rotation at right angles to the movement of said frame.

11. A cheese turning machine comprising a supporting structure, a horizontal roller thereon extending across the same, a frame rotatably mounted on said structure coaxial with said roller, means on said frame for supporting the cheese when said frame is rotated, said latter means being mounted on said frame for rotation at right angles to the movement of said frame.

12. A cheese turning machine comprising a supporting structure, a horizontal removable roller thereon extending across the same, a frame rotatably mounted on said structure movable in a vertical plane, means on said frame for supporting the cheese when said frame is rotated, said latter means being mounted on said frame for rotation at right angles to the movement of said frame.

13. A cheese turning machine comprising a supporting structure, a horizontal removable roller thereon extending across the same, a frame rotatably mounted on said structure coaxial with said roller, means on said frame for supporting the cheese when said frame is rotated, said latter means being mounted on said frame for rotation at right angles to the movement of said frame.

In testimony whereof, I have hereunto set my hand.

THOMAS E. DAY.